US012721779B1

(12) United States Patent
Chen

(10) Patent No.: US 12,721,779 B1
(45) Date of Patent: Sep. 1, 2026

(54) LIVE STREAMING-BASED ADULT TOY CONTROL METHOD AND SYSTEM

(71) Applicant: UC GLOBAL TRADE INC., Chino, CA (US)

(72) Inventor: Junjun Chen, Shenzhen (CN)

(73) Assignee: UC GLOBAL TRADE INC., Chino, CA (US)

( * ) Notice: Subject to any disclaimer, the term of this patent is extended or adjusted under 35 U.S.C. 154(b) by 0 days.

(21) Appl. No.: 19/251,529

(22) Filed: Jun. 26, 2025

(30) Foreign Application Priority Data

May 28, 2025 (CN) ......................... 202510704540.6

(51) Int. Cl.

| | |
|---|---|
| ***A61H 19/00*** | (2006.01) |
| ***A61H 9/00*** | (2006.01) |
| ***A61H 21/00*** | (2006.01) |
| ***A61H 23/02*** | (2006.01) |
| ***G06F 40/279*** | (2020.01) |
| ***G06F 40/30*** | (2020.01) |

(Continued)

(52) U.S. Cl.
CPC ........... *A61H 19/32* (2013.01); *A61H 9/0057* (2013.01); *A61H 21/00* (2013.01); *A61H 23/0254* (2013.01); *G06F 40/279* (2020.01); *G06F 40/30* (2020.01); *G06V 20/40* (2022.01); *G06V 20/62* (2022.01); *H04N 21/20* (2013.01); *H04N 21/44008* (2013.01); *A61H 2201/0192* (2013.01); *A61H 2201/1676* (2013.01); *A61H 2201/5005* (2013.01); *A61H 2201/5015* (2013.01); *A61H 2201/5043* (2013.01)

(58) Field of Classification Search
CPC ........ A61H 19/32; A61H 19/30; A61H 19/40; A61H 19/44; A61H 19/50; G06F 40/279; G06F 40/30; G06V 20/62; G06V 20/40; H04N 21/44008
See application file for complete search history.

(56) References Cited

U.S. PATENT DOCUMENTS

2023/0329962 A1* 10/2023 He ......................... G06Q 50/01
2024/0122791 A1 4/2024 Liu et al.

(Continued)

FOREIGN PATENT DOCUMENTS

CN 105959646 A 9/2016
CN 117440184 B 3/2024
WO 2018/059352 A1 4/2018

*Primary Examiner* — Christine H Matthews
(74) *Attorney, Agent, or Firm* — Ming Jiang; OPENPTO US LLC

(57) ABSTRACT

A live streaming-based adult toy control method includes: acquiring a live streaming video of a target live streaming room on a live streaming platform; identifying the live streaming video to determine live streaming visual effects in the live streaming video; generating a target control command based on the live streaming visual effects; and sending the target control command to a target adult toy to cause the target adult toy to perform an action response based on target control command; where the target adult toy refers to an adult toy that a streamer is broadcasting in the target live streaming room. Through the method, the control of the adult toy matches a scene atmosphere of the live streaming room, and the action responses of the control of adult toy vary with different live streaming visual effects, making the action responses diverse, and effectively boosting the interactive atmosphere of live streaming.

17 Claims, 4 Drawing Sheets

(51) Int. Cl.

| | |
|---|---|
| ***G06V 20/40*** | (2022.01) |
| ***G06V 20/62*** | (2022.01) |
| ***H04N 21/20*** | (2011.01) |
| ***H04N 21/44*** | (2011.01) |

(56) References Cited

U.S. PATENT DOCUMENTS

2025/0063008 A1* 2/2025 Liu ...................... H04N 21/478
2025/0168468 A1* 5/2025 Liu .................. H04N 21/44213
2025/0281348 A1* 9/2025 Presti ..................... A61H 19/34

* cited by examiner 30
303
Adult toy control module
302
Intelligent recognition module
301
Live streaming platform
304
Adult toy

LIVE STREAMING-BASED ADULT TOY CONTROL METHOD AND SYSTEM

CROSS REFERENCE TO RELATED APPLICATIONS

The present application claims priorities of Chinese Patent Application No. 2025107045406, filed on May 28, 2025, the contents of which are hereby incorporated by reference in entirety.

TECHNICAL FIELD

The present disclosure relates to the technical field of live streaming, and in particular to a live streaming-based adult toy control method and system.

BACKGROUND

Live streaming is a form of real-time interactive entertainment, in which a streamer can transmit live videos and audios to online viewers in real time through cameras, microphones, and network technology. Viewers can participate in the interaction in real time by posting comments, giving likes, and sending virtual gifts. Live streaming has become one of the most popular forms of entertainment in the digital age.

At present, adult toys on the market are primarily subjected to manual control or remote control via dedicated applications. When a live stream involves the adult toys, they can only be controlled directly by the streamer, or be indirectly controlled by the viewers by sending virtual gifts to obtain control rights. This single-mode control method leads to a poor interactive experience for viewers.

SUMMARY

In order to solve the above technical problems, the present disclosure provides a live streaming-based adult toy control method and system.

In a first aspect, the present disclosure provides a live streaming-based adult toy control method, including: acquiring a live streaming video of a target live streaming room on a live streaming platform; identifying the live streaming video to determine live streaming visual effects in the live streaming video; generating a target control command based on the live streaming visual effects; and sending the target control command to a target adult toy to cause the target adult toy to perform an action response based on the target control command; where the target adult toy refers to an adult toy that a streamer is broadcasting in the target live streaming room.

Optionally, the target adult toy includes at least one of a vibrator, a massager, an anal plug, a masturbation cup, and a vibrating ring.

Optionally, different live streaming visual effects trigger different target control commands, and the different target control commands correspond to different action responses of the target adult toy.

Optionally, live streaming visual effects of different sizes trigger different target control commands, and the different target control commands correspond to different action responses of the target adult toy.

Optionally, different quantities of live streaming visual effects trigger different target control commands, and the different target control commands correspond to different action responses of the target adult toy.

Optionally, the generating a target control command based on the live streaming visual effects includes: determining a control strategy corresponding to the live streaming visual effects from a pre-constructed mapping table, where the mapping table includes mapping relationships between different live streaming visual effects and the control strategy; and generating the target control command based on the control strategy corresponding to the live streaming visual effects.

Optionally, the mapping relationships between the live streaming visual effects and the control strategy in the mapping table include: a one-to-one mapping relationship between the live streaming visual effects and the control strategies, and a many-to-one mapping relationship between the live streaming visual effects and one control strategy and/or a one-to-many mapping relationship between one live streaming visual effect and the control strategies.

Optionally, when the one-to-many mapping relationship exists between one live streaming visual effect and the control strategies, one control strategy that is mapped to the live streaming visual effect is randomly determined.

Optionally, when the one-to-many mapping relationship exists between one live streaming visual effect and the control strategies, one control strategy that is mapped to the live streaming visual effect is sequentially determined in order.

Optionally, the control strategy includes a control action; where the control action includes at least one of vibration, peristalsis, suction, telescoping, swinging, and pressing.

Optionally, the control strategy further includes a control duration and/or a control parameter, where the control parameter includes at least one of amplitude, frequency, speed, direction, acceleration, intensity, and angle.

Optionally, the live streaming visual effects include at least one of or a combination of at least two of gift visual effects, action visual effects, facial expression visual effects, text visual effects, user ID visual effects, background visual effects, and streamer ornament visual effects.

Optionally, the live streaming visual effects characterize an audience emotional atmosphere in the target live streaming room.

Optionally, a number of the target adult toy is N, where the N is a positive integer greater than or equal to 2.

Optionally, the target adult toy includes a first target adult toy and a second target adult toy; the generating a target control command based on the live streaming visual effects includes: generating a first sub-control command and a second sub-control command based on the live streaming visual effects; where the target control command includes the first sub-control command and the second sub-control command; the sending the target control command to a target adult toy to cause the target adult toy to perform an action response based on the target control command includes sending the first sub-control command to the first target adult toy, such that the first target adult toy perform a first action response based on the first sub-control command; and sending the second sub-control command to the second target adult toy, such that the second target adult toy performs a second action response based on the second sub-control command.

Optionally, the first action response is correlated with the second action response.

Optionally, the first action response cooperates with the second action response.

Optionally, when the live streaming visual effects are the text visual effects, the generating a target control command based on the live streaming visual effects includes: performing semantic recognition on the text visual effects to identify whether a target keyword exists in the text visual effects; where the target keyword characterizes a control operation of the target adult toy; when generating a target control command matching the target keyword when the target keyword exists in the text visual effects.

Optionally, input of the text visual effects is triggered when a user inputs a preset number of virtual coins.

In a second aspect, the present disclosure provides a live streaming-based adult toy control system, including: an acquisition module configured to acquire a live streaming video of a target live streaming room on a live streaming platform; a visual effect recognition module configured to identify the live streaming video to determine live streaming visual effects in the live streaming video; a command generation module configured to generate a target control command based on the live streaming visual effects; and a control module configured to send the target control command to a target adult toy to cause the target adult toy to perform an action response based on the target control command, where the target adult toy refers to an adult toy that a streamer is broadcasting in the target live streaming room.

The present disclosure has the following beneficial effects: the present disclosure provides a live streaming-based adult toy control method, which identifies the live streaming visual effects in the live streaming video to generate different control commands according to different live streaming visual effects, so as to trigger different action responses of the adult toy in the live streaming room. Through the method, the control of the adult toy matches a scene atmosphere of the current live streaming room, and the action responses of the control of adult toy vary with different live streaming visual effects, making the action responses diverse and strong entertainment, effectively boosting the interactive atmosphere of live streaming, and enhancing the user's sense of participation.

DETAILED DESCRIPTIONS OF THE EMBODIMENTS

In the following description, specific details such as particular system structures and technology are provided for the purpose of illustration rather than limitation, so as to facilitate a thorough understanding of the embodiments of the present disclosure. However, it should be clear to those skilled in the art that the present disclosure may be implemented in other embodiments without these specific details. In other instances, detailed descriptions of well-known systems, devices, circuits, and methods are omitted to avoid unnecessary details that might obscure the description of the present disclosure.

In addition, in the description of the specification and the appended claims of the present disclosure, the terms "first", "second", "third", etc. are merely for distinguish between descriptions and may not be understood as indication or implication of relative importance.

At present, adult toys on the market are primarily subjected to manual control or remote control via dedicated applications. When a live stream involves the adult toys, the adult toys can only be controlled directly by the streamer, or be indirectly controlled by the viewers by sending virtual gifts to obtain control rights. The control method is in a single form, and it is difficult to stimulate the emotions of the viewers or boost the atmosphere in the live streaming room.

The present disclosure provides the following embodiments to solve the above problems.

Figure 1:
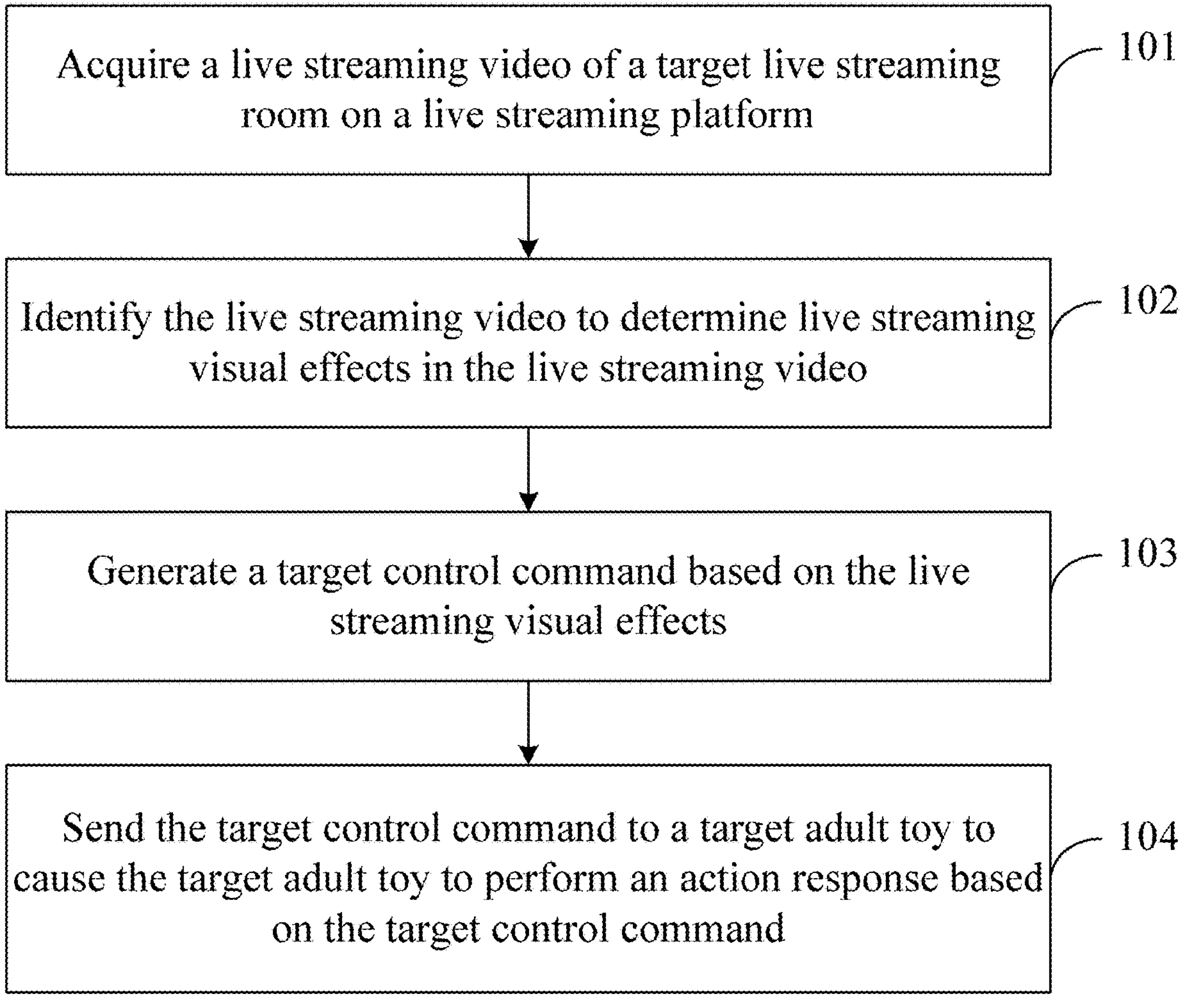
FIG. 1 is a flowchart of steps of one live streaming-based adult toy control method according to an embodiment of the present disclosure.

With reference to FIG. 1, an embodiment of the present disclosure provides a live streaming-based adult toy control method, including steps 101-104.

Step 101: acquiring a live streaming video of a target live streaming room on a live streaming platform.

Generally, the live streaming platform includes a plurality of live streaming rooms, each of the live streaming rooms is hosted by a streamer to broadcast different live streaming content. Viewers can enter the live streaming rooms of their respective favorite streamers to watch the live streaming content. When the streamer starts a live streaming session on the live streaming platform, other user terminals can view the streamer's live streaming room on the live streaming platform.

In this step, the live streaming video of the target live streaming room on the live streaming platform is obtained in real time. The target live streaming room may be any of the live streaming rooms on the live streaming platform.

Step 102: identifying the live streaming video to determine live streaming visual effects in the live streaming video.

After being obtained, the live streaming video of the target live streaming room is identified and analyzed to determine whether the live streaming video includes the live streaming visual effects. The live streaming visual effects refer to content in the live streaming video stream other than the content directly captured by a live streaming camera.

The live streaming visual effects may include content displayed in response to user tipping, such as rockets, planes, and flowers, and may also include user interaction data in the live streaming room, such as chat messages. When the live streaming visual effects are present, Step 103 is directly executed; when no live streaming visual effects are identified, Steps 101-102 are repeated.

Step 103: generating a target control command based on the live streaming visual effects.

In the present disclosure, different live streaming visual effects correspond to different control commands. After the live streaming visual effects in the current video are identified, the corresponding target control commands are generated based on the live streaming visual effects.

Step 104: sending the target control command to a target adult toy to cause the target adult toy to perform an action response based on the target control command.

It should be noted that different target control commands correspond to different action responses of the target adult toy.

Specifically, the target adult toy refers to an adult toy that the streamer is broadcasting in the target live streaming room. In this embodiment, the target adult toy may include but be not limited to, a vibrator, a massager, an anal plug, a masturbation cup, and a vibrating ring.

Correspondingly, the live streaming content in the target live streaming room may include a process in which the streamer is using the target adult toy.

Specifically, after the control command is generated, the target adult toy in the target live streaming room is controlled based on the target control command, such that the target adult toy can achieve the corresponding action response according to the target control command.

For example, a viewer is watching the streamer using an adult toy in the target live streaming room. This solution is used to identify the live streaming video to determine the live streaming visual effects of the current live streaming video, and generate a target control command to control the adult toy to perform corresponding action response, thereby achieving sexual stimulation to the streamer.

In other words, an embodiment of the present disclosure provides an adult toy control method based on live streaming visual effects.

Considering that when the live streaming content of the streamer involves adult toys, the adult toys can be only controlled by the streamer, such as manual control or remote control via applications by the streamer, which results in monotonous control method and poor viewing experience for users. Therefore, the present disclosure provides a live streaming-based adult toy control method, which identifies the live streaming visual effects in the live streaming video to generate different control commands according to different live streaming visual effects, so as to trigger different action responses of the adult toy in the live streaming room. Through the method, the control of the adult toy matches a scene atmosphere of the current live streaming room, and the action responses of the control of adult toy vary with different live streaming visual effects, making the action responses diverse and strong entertainment, effectively boosting the interactive atmosphere of live streaming, and enhancing the user's sense of participation.

Figures 2, 3:
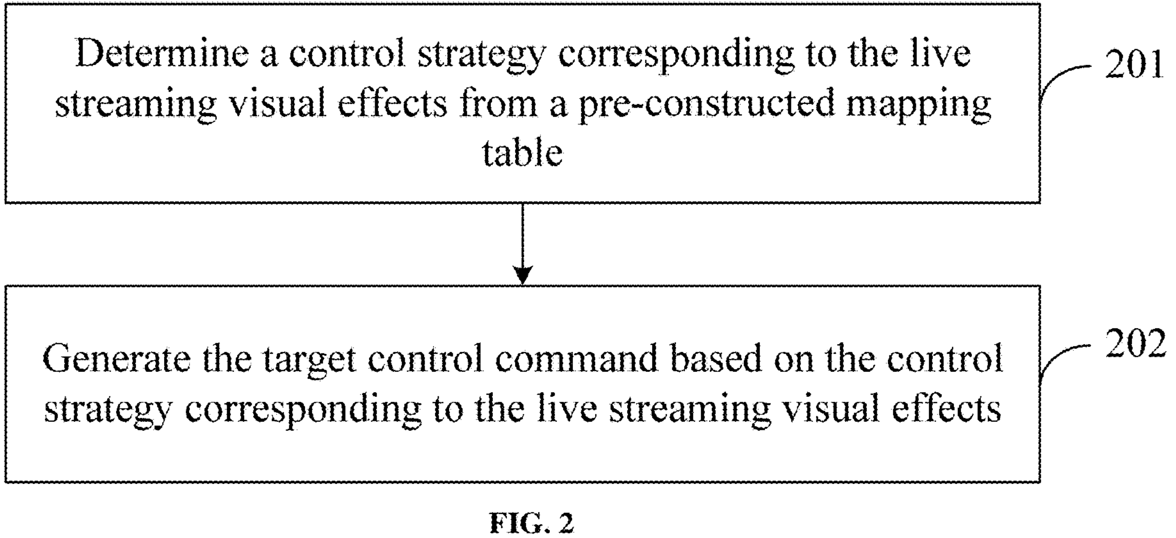
FIG. 2 is a flowchart of steps of another live streaming-based adult toy control method according to an embodiment of the present disclosure.
FIG. 3 is a block diagram of a live streaming system according to an embodiment of the present disclosure.

With reference to FIG. 2, optionally, the above step of generating a target control command based on the live streaming visual effects may specifically include steps 201-202.

Step 201: determining a control strategy corresponding to the live streaming visual effects from a pre-constructed mapping table.

Specifically, the mapping table includes mapping relationships between different live streaming visual effects and the control strategy. That is, different control strategies can be pre-determined based on different live streaming visual effects, and the mapping table is generated accordingly.

Specifically, the mapping table may include a one-to-one mapping relationship, for example, Live Streaming Visual Effect A includes a unique corresponding Control Strategy A.

The mapping table may also include a many-to-one mapping relationships, for example, Live Streaming Visual Effects B, C, and D all correspond to Control Strategy B.

The mapping table may further include a one-to-many mapping relationship, for example, Live Streaming Visual Effect E corresponds to Control Strategies C, D, and E at the same time.

In addition, the mapping table may be implemented as a hash table.

Step 202: generating the target control command based on the control strategy corresponding to the live streaming visual effects.

After the control strategy corresponding to the live streaming visual effects is determined from the mapping table, the target control command is generated accordingly.

It should be noted that when the live streaming visual effects correspond to many control strategies, they may be selected randomly or in order, which will not be limited herein.

It can be seen that an embodiment of the present disclosure provides a matching mechanism between live streaming visual effects and control strategies based on a mapping table, enabling precise control and rapid response.

Optionally, the control strategy may include a control action.

The control action refers to an action that can be executed by the adult toy. The control action may specifically include at least one of vibration, peristalsis, suction, telescoping, swinging, and pressing.

Of course, in other embodiments, the control action may also include at least one of upward movement, downward movement, leftward movement, rightward movement, rising, and descending.

Optionally, in one embodiment, the control strategy may further include a control duration and/or a control parameter.

It should be noted that the control duration may refer to a continuous control duration of the current control action. For example, when the current control action is vibration, the control duration may be 10 seconds, therefore, a complete control strategy is to control the adult toy to vibrate for 10 seconds.

For another example, when the current control action is peristalsis, the control duration may be 5 seconds, and the complete control strategy is to control the adult toy to perform peristalsis for 5 seconds.

The control parameter may refer to physical parameters corresponding to the control actions. For example, the control parameter may include at least one of amplitude, frequency, speed, direction, acceleration, intensity, and angle.

For example, when the current control action is vibration, the control parameter may be a frequency of 30 Hz, and the control strategy may be specifically to control the adult toy to vibrate at the frequency of 30 Hz.

For another example, when the current control action is pressing, the control parameter may be an intensity of 10 N, and the control strategy may be specifically to control the adult toy to press at the intensity of 10 N.

Of course, the control strategy may simultaneously include the control action, the control duration, and the control parameter. For example, when the current control action is vibration, the control duration may be 20 seconds, and the control parameter may be a frequency of 20 Hz, a complete control strategy may be specifically to control the adult toy to vibrate at the frequency of 20 Hz for 20 seconds.

In addition, the control parameter may also refer to a variation of physical parameters, for example, the control parameter may be an increase in frequency by 5 Hz, and the control parameter may also be an angle shifted leftward by 10 degrees.

In addition, the control strategy may include a mode. Different modes may correspond to different control actions, control durations, and/or control parameters. That is, the determined control strategy can characterize a mode switch of the current adult toy.

In addition, a control strategy may include a plurality of control actions at the same time. For example, a control strategy may first control the adult toy to vibrate at the frequency of 20 Hz and maintain the vibration for 20 seconds, and then control the adult toy to press at the intensity of 10 N.

Optionally, in this embodiment, the live streaming visual effects may include at least one or two of the following visual effects: gift visual effects, action visual effects, facial expression visual effects, text visual effects, user identity document (ID) visual effects, background visual effects, and streamer ornament visual effects.

Specifically, the gift visual effects may correspond to the tipping gifts from the user. For example, the tipping gifts from the user may include flowers, airplanes, rockets, sports cars, cakes, rings, glow sticks, and the like.

The action visual effects may be virtual action effects corresponding to the streamer's actions. For example, when the current streamer jumps in the live streaming room, virtual jumping action effects of the streamer may be generated.

Facial expression visual effects may correspond to the streamer's dynamic facial expressions or correspond to the audience emotional atmosphere. For example, when viewers give likes at a high frequency, it means that the audience emotional atmosphere is excited, any facial expression visual effects having an excited expression may be selected from a facial expression library.

The text visual effects may be presented in the form of an animated text explosion. The specific text content of the text visual effects can be used to characterize the current audience emotional atmosphere, such as "so interesting," "really funny," "keep going," and "change it, change it."

The user ID visual effects may refer to an ID of the user who participates in the interaction can be fully displayed on the screen when the current audience emotional atmosphere is fanatical (such as giving likes at a high frequency).

The background visual effects may switch to different backgrounds according to the different audience emotional atmospheres. For example, when the audience emotional atmosphere is calm, the background visual effects are switched to ordinary room background visual effects, and when the audience emotional atmosphere is fanatical, the background visual effects are switched to game background visual effects.

The streamer ornament visual effects refer to switching different ornament visual effects for the streamer based on different audience emotional atmospheres. For example, the streamer ornament visual effects may be headscarf visual effects, helmet visual effects, sunglasses visual effects, backpack visual effects, tie visual effects, and the like. When the audience emotional atmosphere is calm, the streamer ornament visual effects may be the headscarf visual effects; and when the audience emotional atmosphere is fanatical, the streamer ornament visual effect may be exploding helmet visual effects.

Of course, the live streaming visual effects may also include combination of the aforementioned visual effects. Specifically, when the audience emotional atmosphere is fanatical, the action visual effects with a countdown may first be displayed, followed by huge fireworks gift visual effects.

It should be noted that in the embodiments of the present disclosure, the audience emotional atmosphere may be determined based on interaction data of the viewers in the live streaming room. The interaction data may specifically include at least one of tipping data, comment data, and like data.

In one embodiment, the live streaming visual effects may characterize the current audience emotional atmosphere in the target live streaming room. The audience emotional atmosphere may be triggered based on the interaction data. Different amounts or frequencies of interaction data may characterize different audience emotional atmospheres, which in turn can generate different live streaming visual effects.

Different live streaming visual effects trigger different target control commands, which will be described below.

In on embodiment, different live streaming visual effects trigger different target control commands.

Exemplarily, different categories of visual effects may be identified as different types of live streaming visual effects, for example, gift visual effects, action visual effects, facial expression visual effects, text visual effects, user ID visual effects, background visual effects, and streamer ornament visual effects may be identified as different types of live streaming visual effects.

Exemplarily, different visual effects in a same category may be identified as different types of live streaming visual effects. For example, for the gift visual effects, flowers and rockets may be identified as different types of live streaming visual effects.

In one case, different types of live streaming visual effects may be determined according to different audience emotional atmospheres in the live streaming room. In other words, different audience emotional atmospheres in the live streaming room may trigger different types of live streaming visual effects, which in turn generate different target control commands to achieve different action responses of the target adult toy.

In one embodiment, live streaming visual effects of different sizes trigger different target control commands.

Exemplarily, different size intervals may be preset, such as Size Interval A, Size Interval B, Size Interval C, and Size Interval D. Size ranges of Size Interval A, Size Interval B, Size Interval C, and Size Interval D decrease in sequence. Different size intervals correspond to different target control commands. After the live streaming visual effects in the live streaming video are identified, a size of the live streaming visual effects is calculated, a size range the live streaming visual effects belongs to is then determined, and the target control command corresponding to the size range is then generated.

In one case, different audience emotional atmospheres in the live streaming room may be used to determine live streaming visual effects of different sizes. In other words, different audience emotional atmospheres in the live streaming room may trigger live streaming visual effects of different sizes, which in turn generate different target control commands to achieve different action responses of the target adult toy.

For example, when the audience emotional atmosphere is indifferent, a visual effect magnification ratio 1; when the audience emotional atmosphere is calm, the visual effect magnification ratio is 1.5; when the audience emotional atmosphere is active, the visual effect magnification ratio is 2; and when the audience emotional atmosphere is enthusiastic, the visual effect magnification ratio is 4. Moreover, when the audience emotional atmosphere is enthusiastic, the visual effects are displayed in at least half of the live streaming screen to present the current enthusiastic atmosphere in the live streaming room.

In one embodiment, different quantities of live streaming visual effects trigger different target control commands.

Exemplarily, different quantity intervals may be preset, such as Quantity Interval A, Quantity Interval B, Quantity Interval C, and Quantity Interval D. Quantity ranges of Quantity Interval A, Quantity Interval B, Quantity Interval C, and Quantity Interval D decrease in sequence. Different quantity intervals correspond to different target control commands. After the live streaming visual effects in the live streaming video are identified, a quantity of the current live streaming visual effects is calculated, a quantity range the current live streaming visual effects belongs to is then determined, and the target control command corresponding to the quantity range is then generated.

In one case, different quantities of live streaming visual effects may characterize different audience emotional atmospheres. For example, when the live streaming visual effects are the gift visual effects, it may correspond to the viewers' tipping data; the more gift visual effects, the more enthusiastic the audience emotional atmosphere in the live streaming room.

Different target control commands correspond to different action responses of the target adult toy.

The mapping relationships between live streaming visual effects and target control commands are exemplarily illustrated below.

For example, when the live streaming visual effects are a single flower, the target control command may include controlling the adult toy to vibrate for 3 seconds, such that the adult toy is controlled to vibrate for 3 seconds under the drive of the target control command.

For another example, when the live streaming visual effects are a full screen of flowers, the target control command may include controlling the adult toy to perform peristalsis for 10 seconds, such that the adult toy is controlled to perform peristalsis for 10 seconds under the drive of the target control command.

For yet another example, when the live streaming visual effects are fireworks of a first size, the target control command may include controlling the adult toy to vibrate at a frequency of 10 Hz, such that the adult toy is controlled to vibrate at the frequency of 10 Hz under the drive of the target control command.

For still another example, when the live streaming visual effects are fireworks of a second size, where the fireworks of a second size are greater than the fireworks of a first size, and the target control command may include controlling the adult toy to vibrate at a frequency of 20 Hz and maintain the vibration for 20 seconds, such that the adult toy is controlled to vibrate at the frequency of 20 Hz and maintain vibration for 20 seconds under the drive of the target control command.

Optionally, a number of the target adult toy may be N, where Nis a positive integer greater than or equal to 2.

That is, in the same live streaming room, the N target adult toys may be controlled at the same time according to the live streaming visual effects of the live streaming video of the current live streaming room.

Optionally, when the N is 2, the target adult toy includes a first target adult toy and a second target adult toy.

The above Step 103 of generating a target control command based on the live streaming visual effects includes: generating a first sub-control command and a second sub-control command based on the live streaming visual effects; and the target control command includes the first sub-control command and the second sub-control command.

Correspondingly, the above Step 104 of sending the target control command to a target adult toy to cause the target adult toy to perform an action response based on the target control command includes: sending the first sub-control command to the first target adult toy, such that the first target adult toy perform a first action response based on the first sub-control command; and sending the second sub-control command to the second target adult toy, such that the second target adult toy performs a second action response based on the second sub-control command.

In other words, considering product differences among the target adult toys, sub-control commands matching different target adult toys may be generated based on the live streaming visual effects, so as to achieve precise control.

For example, when the first target adult toy is a vibrator, the first sub-control command corresponding to the vibrator may be to control the vibrator to vibrate at a frequency of 10 Hz and maintain the vibration for 10 seconds. When the second target adult toy is a masturbation cup, the second sub-control command corresponding to the masturbation cup may be to increase a suction intensity of the masturbation cup and maintain the suction intensity for 10 seconds. Specifically, increasing the suction intensity may specifically be to increase the suction intensity from level 1 to level 2.

In addition, in a scenario, the first action response and the second action response may be correlated or cooperated with each other, where the mutual correlation may indicate consistency of the type of actions. For example, the mutually correlated scenario may be where both the first action response and the second action response are vibration actions (the vibration frequencies may be different). For example, the mutually cooperated scenario may be where the first target adult toy extends forward, while the second target adult toy retracts backward; or the first target adult toy retracts backward, while the second target adult toy extends forward.

Optionally, when the live streaming visual effects are the text visual effects, the above step of generating a target control command based on the live streaming visual effects includes: performing semantic recognition on the text visual effects to identify whether a target keyword exists in the text visual effects; where the target keyword characterizes a control operation of the target adult toy; when generating a target control command matching the target keyword when the target keyword exists in the text visual effects.

For example, when the text visual effects are "Set the speed faster," and the target keyword "speed faster" is identified, a target control command for accelerating the speed is then generated.

In other words, an embodiment of the present disclosure provides an interactive method by which the audience directly triggers a target adult toy. Specifically, the audience can directly input the text visual effects to trigger the action response of the target adult toy in the form of text.

In this embodiment, it may be set that the user needs to input a preset number of virtual coins (such as 5 gold coins, 10 gold coins) before inputting the text visual effects, so as to avoid malicious operation by the viewers. In addition, since the text visual effects are directly displayed in the live streaming video, other viewers can intuitively perceive the correlation between the user's control operation and the action response of the target adult toy, thereby improving the user experience.

In summary, the live streaming-based adult toy control method provided by the present disclosure can respond to the visual effects to form rich product actions or action combination feedback, so as to provide sexual stimulation to the streamer, further improving the live streaming experience of the audience. This solution has the advantages that it can respond to visual effects and combinations of the visual effects, which can better match the creation of the live streaming atmosphere and mobilize the emotions on the scene, therefore, they are important indicators of the live streaming effect.

With reference to FIG. 3, an embodiment of the present disclosure further provides a live streaming system 30. The live streaming system includes a live streaming platform 301, an intelligent recognition module 302, an adult toy control module 303, and an adult toy 304.

Specifically, the live streaming platform 301 includes a plurality of live streaming rooms that are broadcasting. The intelligent recognition module 302 is configured to acquire a live streaming video of a target live streaming room from the live streaming platform 301; to identify the live streaming video and determine live streaming visual effects in the live streaming video; the adult toy control module 303 is configured to generate a target control command based on the live streaming visual effects; and to send the target control command to the adult toy 304; and the adult toy 304 gives an action response based on the target control command.

Figure 4:
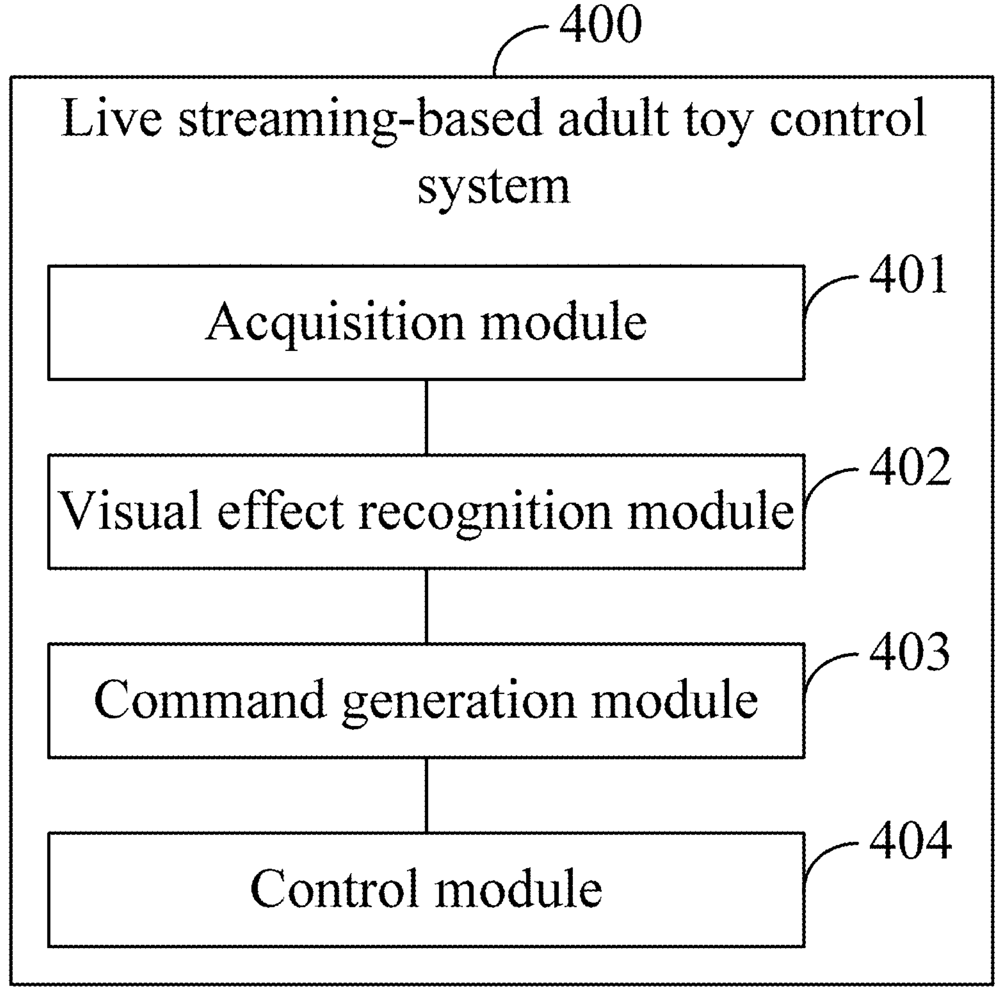
FIG. 4 is a block diagram of a live streaming-based adult toy control system according to an embodiment of the present disclosure.

With reference to FIG. 4, based on the same inventive concept, an embodiment of the present disclosure further provides a live streaming-based adult toy control system 400, including:

an acquisition module 401 configured to acquire a live streaming video of a target live streaming room on a live streaming platform.

a visual effect recognition module 402 configured to identify the live streaming video to determine live streaming visual effects in the live streaming video.

a command generation module 403 configured to generate a target control command based on the live streaming visual effects.

a control module 404 configured to send the target control command to a target adult toy to cause the target adult toy to perform an action response based on the target control command, where the target adult toy refers to an adult toy that the streamer is broadcasting in the target live streaming room.

Figure 5:
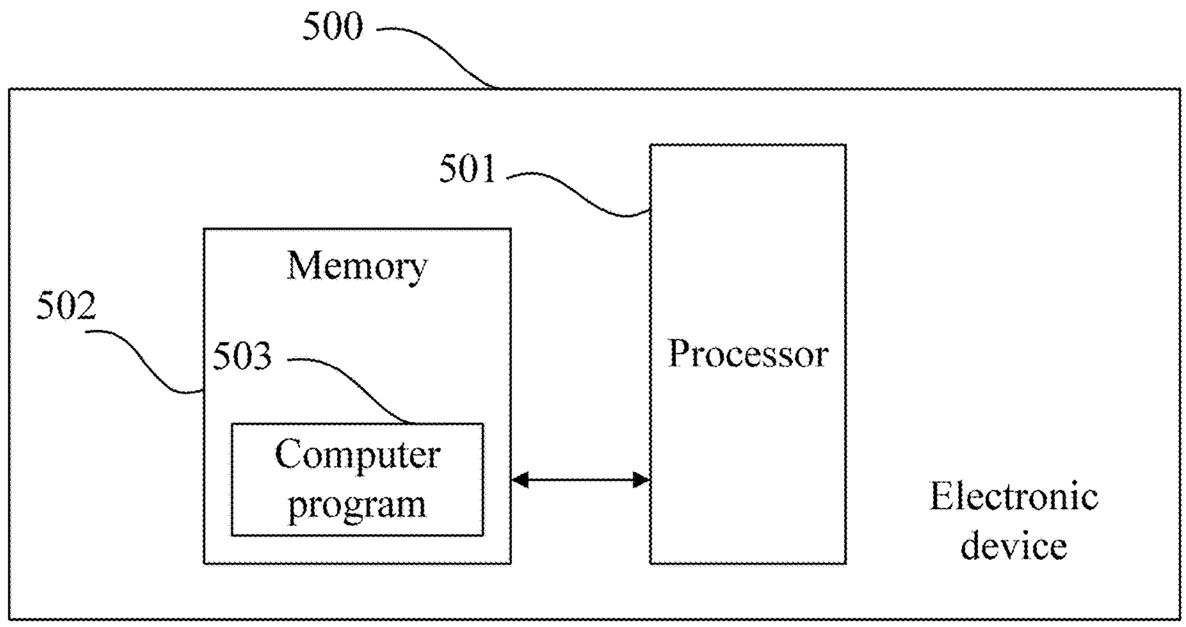
FIG. 5 is a block diagram of an electronic device according to an embodiment of the present disclosure.

With reference to FIG. 5, based on the same inventive concept, an embodiment of the present disclosure further provides a module frame of an electronic device 500 applying the above method. The electronic device 500 includes: at least one processor 501 (only one processor is shown in FIG. 5), a memory 502, and a computer program 503 stored in the memory 502 and executable on the at least one processor 501. When the processor 501 executes the computer program 503, the steps of the method in any of the above embodiments are implemented.

The electronic device 500 may be a server, a personal computer, a laptop computer, or the like.

Those skilled in the art can understand that FIG. 5 is merely an example of an electronic device 500 and does not constitute a limitation on the electronic device 500, which can include more or fewer components than those illustrated, or combination of certain components, or different components.

The processor 501 may be a central processing unit (CPU), or the processor 501 may be other general-purpose processor, digital signal processor (DSP), application-specific integrated circuit (ASIC), field-programmable gate array (FPGA), or other programmable logic device, discrete gate or transistor logic device, discrete hardware component, and the like. The general-purpose processor can be a microprocessor, or any conventional processor.

In some embodiments, the memory 502 may be an internal storage unit of the electronic device 500, such as a hard disk or memory of the electronic device 500. In other embodiments, the memory 502 may be an external storage device of the electronic device 500, such as a plug-in hard drive, a smart media card (SMC), a secure digital (SD) card, a flash card, or the like attached to the electronic device 500. Further, the memory 502 may include both the internal storage unit and the external storage device of the electronic device 500.

It should be noted that the above-mentioned systems, devices, etc. are based on the same inventive concept as the method embodiments of the present disclosure, their designed modules, the steps executed by the devices, and the technical effects achieved may be referred to in the description of the method embodiments, which will not be repeated herein.

Those skilled in the art can clearly understand that for convenience and conciseness of description, only the division of the above functional units or modules is given by way of example. In practical application, the above functions may be allocated to different functional units or modules, as needed; that is, an internal structure of the device may be divided into different functional units or modules to complete all or part of the functions described above. The functional units or modules in the embodiments may be integrated into one processing unit, or each unit may exist physically separately, or two or more units may be integrated together into one unit. The above integrated unit can be implemented in the form of hardware or in the form of a software functional unit. In addition, the specific names of the functional units or modules are only given for ease of distinction and are not intended to limit the scope of protection of the present disclosure.

The specific working process of the units or modules in the above system can be referred to the corresponding process in the embodiments, which will not be described in detail herein.

An embodiment of the present disclosure further provides a computer-readable storage medium, which stores a computer program, where the computer program is executed by a processor, and the steps of the method in any of the above embodiments can be implemented.

An embodiment of the present disclosure also provides a computer program product, when the computer program product is executed on a mobile terminal, the mobile terminal is enabled to implement the steps of the method in any of the above embodiments.

When the integrated unit is implemented as software functional units and sold or used as independent products, it can be stored in a computer-readable storage medium. Those skilled in the art may understand that implementation of all or some procedures in the methods of the above embodiments may be accomplished by instructing related hardware by means of a computer program. The computer program can be stored in the computer-readable storage medium, and when the computer program is executed, the procedures of the above embodiment for the method can be included. The computer program includes computer program code, the computer program code can be in the form of source code, object code, executable file or some intermediate form. The computer-readable medium may at least include any entity or device capable of carrying the computer program code to the photo device/electronic device, recording media, computer memory, Read-Only Memory (ROM), Random Access Memory (RAM), electric carrier signals, telecommunication signals, and software distribution media, such as a USB flash drive, a mobile hard disk, a magnetic disk, or an optical disk.

In the above embodiments, the descriptions of all embodiments have their respective focuses. Any part not recorded or described in one embodiment may be referred to in the relevant descriptions of other embodiments.

Those ordinary skill in the art may realize that units and algorithm steps of various examples described with reference to the embodiments disclosed herein may be implemented by electronic hardware, or a combination of computer software and electronic hardware. Whether the functions are executed in hardware or software depends on the specific application and design constraints of the technical solution. Those skilled in the art may use different methods to implement the described functions for each particular application, but such implementation should not be considered to be beyond the scope of the present disclosure.

In the embodiments provided in the present application, it should be understood that the disclosed equipment/network device and method can be implemented in other ways. For example, the embodiments about the equipment/network device described above are merely illustrative, for example, the division of the modules or units is only a logical function division, there may be additional divisions in actual implementation, for example, multiple units or components may be combined or integrated into another system, or some features may be ignored, or not implemented. In addition, the mutual coupling or direct coupling or communication connection shown or discussed may be an indirect coupling or communication connection through some interface, device or unit, and may be electrical, mechanical or otherwise.

The units described as separate components may or may not be physically separated, and a component displayed as a unit may or may not be a physical unit, that is, the component may be located at one place, or distributed on a plurality of network units. Part or all of the units may be selected according to actual requirements to achieve the objective of the solution of the embodiments.

To sum up, the above embodiments are merely intended for describing the technical solution of the present disclosure rather than limiting the present disclosure. Although the present disclosure is described in detail with reference to the above embodiments, those of ordinary skill in the art should understand that they can still make modifications to the technical solution described in the embodiments or equivalent substitutions to some technical features of the technical solution. These modifications or substitutions do not enable the corresponding technical solution to depart from the spirit and scope of the technical solutions in all the embodiments of the present disclosure, and should fall within the scope of protection of the present disclosure.

What is claimed is:

1. A live streaming-based adult toy control method, comprising:

acquiring a live streaming video of a target live streaming room on a live streaming platform;

identifying a live streaming visual effect in the live streaming video, wherein the live streaming visual effect characterizes a current audience scene atmosphere of the target live streaming room;

determining a control strategy corresponding to the live streaming visual effect from a pre-constructed mapping table, wherein the mapping table comprises a mapping relationship between different live streaming visual effects and different control strategies;

generating a target control command based on the control strategy corresponding to the live streaming visual effect, wherein the target control command comprises a first sub-control command and a second sub-control command; and sending the target control command to a target adult toy to cause the target adult toy to perform an action response based on the target control command, wherein the target adult toy refers to an adult toy that a streamer is broadcasting in the target live streaming room, the target adult toy comprises a first target adult toy and a second target adult toy, and the sending the target control command to a target adult toy to cause the target adult toy to perform an action response based on the target control command comprises:

sending the first sub-control command to the first target adult toy to cause the first target adult toy to perform a first action response based on the first sub-control command; and sending the second sub-control command to the second target adult toy to cause the second target adult toy to perform a second action response based on the second sub-control command.

2. The live streaming-based adult toy control method according to claim 1, wherein the target adult toy comprises at least one of a vibrator, a massager, an anal plug, a masturbation cup, and a vibrating ring.

3. The live streaming-based adult toy control method according to claim 1, wherein the different live streaming visual effects trigger different target control commands, and the different target control commands correspond to different action responses of the target adult toy.

4. The live streaming-based adult toy control method according to claim 1, wherein live streaming visual effects of different sizes trigger different target control commands, and the different target control commands correspond to different action responses of the target adult toy.

5. The live streaming-based adult toy control method according to claim 1, wherein different quantities of live streaming visual effects trigger different target control commands, and the different target control commands correspond to different action responses of the target adult toy.

6. The live streaming-based adult toy control method according to claim 1, wherein the mapping relationship between different live streaming visual effects and different control strategies in the mapping table comprises:

a one-to-one mapping relationship between the different live streaming visual effects and the different control strategies, a many-to-one mapping relationship between the different live streaming visual effects and the different control strategies, and/or a one-to-many mapping relationship between the different live streaming visual effects and the different control strategies.

7. The live streaming-based adult toy control method according to claim 6, wherein when the mapping relationship between different live streaming visual effects and different control strategies is the one-to-many mapping relationship, the control strategy corresponding to the live streaming visual effect is randomly determined from the control strategies in the mapping table.

8. The live streaming-based adult toy control method according to claim 6, wherein when the mapping relationship between different live streaming visual effects and different control strategies is the one-to-many mapping relationship, the control strategy corresponding to the live streaming visual effect is sequentially determined in order.

9. The live streaming-based adult toy control method according to claim 1, wherein the control strategy corresponding to the live streaming visual effect comprises a control action; and wherein the control action comprises at least one of vibration, peristalsis, suction, telescoping, swinging, and pressing.

10. The live streaming-based adult toy control method according to claim 9, wherein the control strategy corresponding to the live streaming visual effect further comprises a control duration and/or a control parameter; and wherein the control parameter comprises at least one of amplitude, frequency, speed, direction, acceleration, intensity, and angle.

11. The live streaming-based adult toy control method according to claim 1, wherein the live streaming visual effect comprises at least one of or a combination of at least two of:

a gift visual effect, the gift visual effect being a display effect corresponding to user tipping, an action visual effect, the action visual effect being a virtual action effect corresponding to an action of the streamer, a facial expression visual effect, the facial expression visual effect corresponding to a dynamic facial expression of the streamer, a text visual effect, the text visual effect being an animated text explosion in the live streaming video, a user identity document (ID) visual effect, the user ID visual effect being a user ID display effect of a user participating in interaction, a background visual effect, the background visual effect being a display effect of live streaming background according to audience emotional atmosphere, and a streamer ornament visual effect, the streamer ornament visual effect being an ornament visual effect for the streamer.

12. The live streaming-based adult toy control method according to claim 1, wherein the current audience scene atmosphere of the target live streaming room is determined based on interaction data of viewers in the target live streaming room, the interaction data including at least one of tipping data and comment data.

13. The live streaming-based adult toy control method according to claim 1, wherein the first action response is correlated with the second action response.

14. The live streaming-based adult toy control method according to claim 1, wherein the first action response cooperates with the second action response.

15. The live streaming-based adult toy control method according to claim 1, wherein when the live streaming visual effect is a text visual effect, the generating a target control command based on the control strategy corresponding to the live streaming visual effect comprises:

performing semantic recognition on the text visual effect to identify whether a target keyword exists in the text visual effect; wherein the target keyword characterizes a control operation of the target adult toy; and generating a target control command matching the target keyword when the target keyword exists in the text visual effect.

16. The live streaming-based adult toy control method according to claim 15, wherein input of the text visual effect is triggered when a user inputs a preset number of virtual coins.

17. A live streaming-based adult toy control system, comprising:

an acquisition module configured to acquire a live streaming video of a target live streaming room on a live streaming platform;

a visual effect recognition module configured to identify a live streaming visual effect in the live streaming video, wherein the live streaming visual effect characterizes a current audience scene atmosphere of the target live streaming room;

a command generation module configured to determine a control strategy corresponding to the live streaming visual effect from a pre-constructed mapping table, wherein the mapping table comprises a mapping relationship between different live streaming visual effects and different control strategies; and generate a target control command based on the control strategy corresponding to the live streaming visual effect, wherein the target control command comprises a first sub-control command and a second sub-control command; and a control module configured to send the target control command to a target adult toy to cause the target adult toy to perform an action response based on the target control command, wherein the target adult toy refers to an adult toy that a streamer is broadcasting in the target live streaming room, the target adult toy comprises a first target adult toy and a second target adult toy, and the control module is further configured to:

send the first sub-control command to the first target adult toy to cause the first target adult toy to perform a first action response based on the first sub-control command; and send the second sub-control command to the second target adult toy to cause the second target adult toy to perform a second action response based on the second sub-control command.

* * * * *